United States Patent
Lund et al.

(10) Patent No.: US 9,350,720 B2
(45) Date of Patent: May 24, 2016

(54) DELEGATING AUTHORIZATIONS

(71) Applicant: Cable Television Laboratories, Inc., Louisville, CO (US)

(72) Inventors: Robert M. Lund, Boulder, CO (US); Oscar G. Marcia, Broomfield, CO (US); Steven E. Johnson, Boulder, CO (US)

(73) Assignee: Cable Television Laboratories, Inc., Louisville, CO (US)

( * ) Notice: Subject to any disclaimer, the term of this patent is extended or adjusted under 35 U.S.C. 154(b) by 0 days.

(21) Appl. No.: 14/284,667

(22) Filed: May 22, 2014

(65) Prior Publication Data

US 2015/0128237 A1    May 7, 2015

Related U.S. Application Data

(60) Provisional application No. 61/899,990, filed on Nov. 5, 2013.

(51) Int. Cl.
*H04L 29/06* (2006.01)
*H04L 9/32* (2006.01)

(52) U.S. Cl.
CPC .............. *H04L 63/08* (2013.01); *H04L 9/3213* (2013.01); *H04L 63/0884* (2013.01)

(58) Field of Classification Search
USPC ............................................................. 726/7
See application file for complete search history.

(56) References Cited

U.S. PATENT DOCUMENTS

| | | | |
|---|---|---|---|
| 2009/0271713 A1* | 10/2009 | Stull et al. ...................... 715/753 |
| 2009/0313321 A1* | 12/2009 | Parsons et al. ................. 709/203 |
| 2012/0117586 A1* | 5/2012 | Mccoy et al. ................... 725/25 |
| 2014/0007205 A1* | 1/2014 | Oikonomou ............ G06F 21/35 726/6 |

* cited by examiner

*Primary Examiner* — Jason Lee
(74) *Attorney, Agent, or Firm* — Great Lakes Intellectual Property, PLLC.

(57) ABSTRACT

Delegation of authorizations from one device to another device is contemplated. The contemplated capabilities may enable an authenticated device to confer access tokens or other authoritative permissions to a non-authenticated or unsecured device, such as to enable the delegated device to access user content without the user having to enter a username and password or other identifying credentials thereto.

19 Claims, 9 Drawing Sheets

DELEGATING AUTHORIZATIONS

CROSS-REFERENCE TO RELATED APPLICATIONS

This application claims the benefit of U.S. provisional Application No. 61/899,990 filed Nov. 5, 2013, the disclosure of which is incorporated in its entirety by reference herein.

TECHNICAL FIELD

The present invention relates to delegating authorizations from an authenticated device to another device, such as but not necessarily limited to conferring a user identity established for the authenticated device to a non-authenticated device or unsecured device.

BACKGROUND

A user may authenticate a user identity with a device by inputting user information, such as a username and password combination, personal identification number (PIN) or other identifying information, through the device for verification with an identify provider (IdP), a trusted authority, trusted certificate authority, etc. The ability to establish the user identity with a particular device may be beneficial in enabling that device to access user content previously stored or otherwise kept at a service provider, such as but not necessary limited to user content kept with file service providers, social media providers, Internet service providers, messaging providers (text, email, etc.) or other service providers tasked with managing user content for a plurality of users on an individual basis. Some such service providers may provide a webpage, portal, application or other interface through which user content may be accessed and/or manipulated in desirable ways upon receipt of the user information necessary to authenticate a device with a particular user identity. A vast number of such service providers are available and utilize user identity and other trust related mechanisms for managing access to user content.

User content for a single user may be stored across multiple service providers, such as to facilitate maintaining work files at one service provider while maintaining social media or personal pictures at a different service provider. Any number of scenarios may exist where users find themselves keeping or maintaining their personal user content at various service providers. The service providers may operate disparate procedures, protocols and other processes for controlling, maintain or otherwise authenticating access to the user content within their control, which can be problematic and inconvenient for the users. One non-limiting aspect of the present invention accordingly contemplates ameliorating the burden and inconvenience attendant to users storing user content across multiple service providers.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
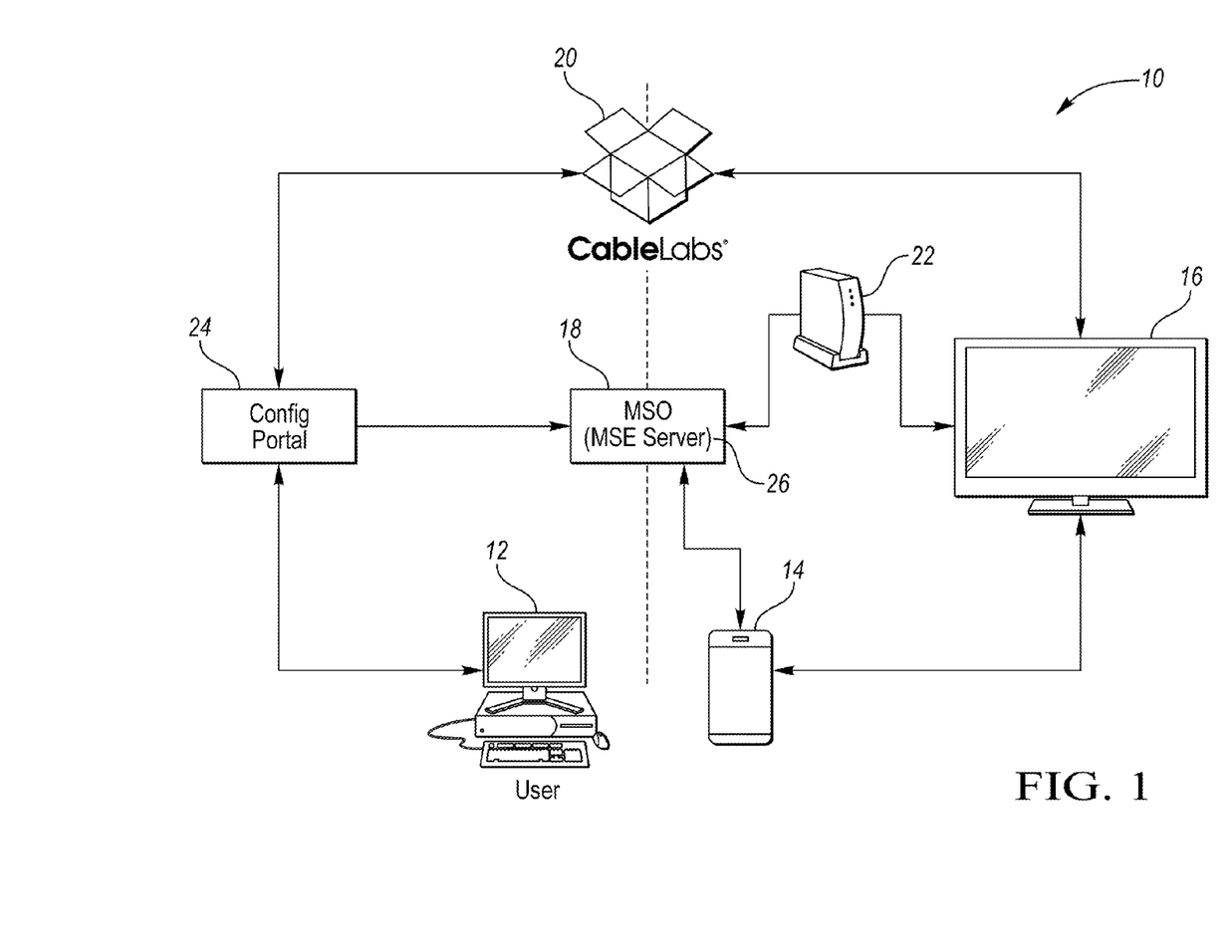
FIG. 1 illustrates a system for delegating authorizations in accordance with one non-limiting aspect of the present invention.

FIG. 1 illustrates a system 10 for delegating authorizations in accordance with one non-limiting aspect of the present invention. The system 10 illustrates an exemplary implementation of the present invention where a user 12 may desire to delegate authorizations from an authenticated device (referred to hereinafter as a control device) 14 to a non-authenticated device (refer to hereinafter as a sink device) 16. The ability to delegate authorizations in the contemplated manner may be beneficial in conferring a user identity to the sink device 16 so as to permit the sink device 16 access to user content associated with the user. The contemplated conferring of user identity may be facilitated in a manner that eases the burden and inconvenience associated with enabling access to user content kept service providers 18, 20, particularly when a single user keeps or maintains content at multiple service providers 18 and desires to enable the control and/or sink devices 14, 16 to access the dispersed user content. The contemplated conferring of user identity may also remove the need for the user to repeatedly convey their identity for multiple service providers thereby reducing the unauthorized identity sharing or identity theft. The system 10 illustrates a first service provider 18 and a second service provider 20 for exemplary non-limiting purposes as the user may desire access to user content stored at any number of service providers 18, 20.

The user content may correspond with any type of electronically transmissible content or media associated with the user, such as but not necessary limited to computer files, videos, pictures, messages, recordings, etc. The first and second service providers 18, may have a relationship with the user to provide services for content provided from the user and/or to provide content from other sources to the user. The first service provider 18 may correspond with a multiple system operator (MSO) configured to provide television services, Internet services, high-speed data services, etc. by way of an access point 22 under its control, such as in the manner described in U.S. patent application Ser. No. 14/181,640, entitled Multiple-Input Multiple-Output (MIMO) Communication System, the disclosure of which is hereby incorporated by reference in its entirety. The access point 22 is shown for exemplary non-limiting purposes to correspond with a gateway or a router, such as but not necessary limited to a cable modem or a set-top box (STB). The second service provider 20, while it may be part of the first service provider 18, is shown for exemplary non-limiting purposes to operate independently of the first service provider 18 as an over-the-top service dependent on the access point 22 controlled with the first service provider 18.

FIG. 1 illustrates a configuration portal 24 configured in accordance with the present invention to facilitate registering a user identity for the user with the second service provider 20. The configuration portal 24 may be a webpage or other interface sufficient to facilitate the operations contemplated herein. The configuration portal 24 may include capabilities to enable communications between the user (computer) 12 and the first and second service providers 18, 20 to enable exchange of access tokens, credentials or other trust related mechanisms. One non-limiting aspect of the present invention contemplates the configuration portal 24 being utilized to facilitate the second service provider 20 authenticating the user and issuing a corresponding access token for safekeeping at a My Stuff Everywhere (MSE) server 26 of the first service provider 18. The user 12, the configuration portal 24 and/or the first and second service providers 18, 20 may obtain, issue, preserve and execute access tokens or perform other related operations in the manner described in U.S. patent application Ser. No. 13/423,359, entitled Multiple Access Point Zero Sign-On, the disclosure of which is hereby Incorporated by reference in its entirety. The number of times user is required to enter a username and password combination or provide other authenticating information via user input of alphanumeric characters may be ameliorated using ZSO techniques.

One non-limiting aspect of the present invention relates to delegating authorizations when access to content from another service provider is desired, such as in the above-described process where the user may desire conferring authorizations in order to enable the sink device 14 access to user content stored at the second provider 20. The user desiring to allow the sink device 16 to access the user's content at the second service provider 20 may be non-authenticated or otherwise unknown to the first service provider 18 and/or the second service provider 20 whereas the control device 14 may be authenticated with the first service provider 18. The control device 14 may be a device trusted by the first service provider 18 and/or that has completed a sign-on operation or otherwise provided credentials to the first service provider 18. The control device 14 uses its established trust with the first service provider 18 to confer access tokens to the user's content at the second service provider 20 to the non-authenticated sink device 16, thereby creating a temporary authentication for the sink device 14 to access the user's content at the second service provider 20. The control device 14 may be a mobile phone, a computer or other device issued or maintained by the first service provider such that it may have already registered with the first service provider 18 to access related services. The sink device 16 may not have registered itself with the first service provider 18 or the second service provider 20, e.g., the sink device 16 may be a web-enabled television or other device operable to playback television programming streamed over the Internet as opposed to the control device 14 that may be similarly configured to playback television programming stream from the first service provider 18.

The contemplated delegation of authorizations may be utilized to enable user access to content essentially everywhere or on virtually any device even if the device has not been authenticated or otherwise identified to one of the first and second service providers 18, 20 or other non-illustrated service providers operable according to the processes described herein. The delegated authorizations are predominately described as being authorizations conferred with an access token for exemplary non-limiting purposes as the present invention fully contemplates delegating other types of authorizations besides just those attendant to use of access tokens. The contemplated access tokens may be mechanisms by which entitlements, rights or other user specific information may be tangibly transferred from one place to another. The transfer of access tokens is also predominately described with respect to the second service provider 20 or additional non-illustrated service providers operating independently of the first service provider 18 transmitting the access tokens to the first service provider 18 for subsequent delegation. The service provider 20 originating the access tokens may relate each access token to one or more users and their corresponding user content such that each access token may provide access to a certain portion of the user content associated with the related service provider 20.

The present invention contemplates the use of various protocols and formats to facilitate message and other operations attendant to facilitating the contemplated processes, including but not limited to [AUTH1.0] Authentication and Authorization Interface 1.0 Specification, CL-SP-AUTH1.0-103-120118, Jan. 18, 2012, Cable Television Laboratories, Inc.; [ID-BearerTokens] IETF Internet Draft, The OAuth 2.0 Authorization Protocol: Bearer Tokens, M. Jones, D. Hardt, and D. Recordon, draft-ietf-oauth-v2-bearer-15.txt, December 2011; [ID-JWT] IETF Internet Draft, JSON Web Token (JWT), M. Jones, D. Balfanz, J. Bradley, Y. Goland, J. Panzer, N. Sakimura, P. Tarjan, draft-jones-json-web-token-07.txt, December 2011; [ID-OAuth Assertions] IETF Internet Draft, OAuth 2.0 Assertion Profile, M. Jones, B. Campbell, Y. Goland, draftietf-oauth-assertions-01, October 2011; [ID-OAuth] IETF Internet Draft, The OAuth 2.0 Authorization Protocol, E. H-Lahav, D. Recordon, D. Hardt, draft-ietf-oauth-v2-22.txt, September 2011; [SAML Bindings] OASIS Standard, Bindings for the OASIS Security Assertion Markup Language (SAML) v2.0, March 2005; [SAML Core] OASIS Standard, Assertions and Protocols for the OASIS Security Assertion Markup Language (SAML) v2.0, March 2005; OAuth; Security Assertion Markup Language (SAML), JavaScript Object Notation (JSON); Bearer Tokens; Online Content Access (OLCA); the disclosures of which are hereby incorporated by reference in their entirety.

Figure 2:
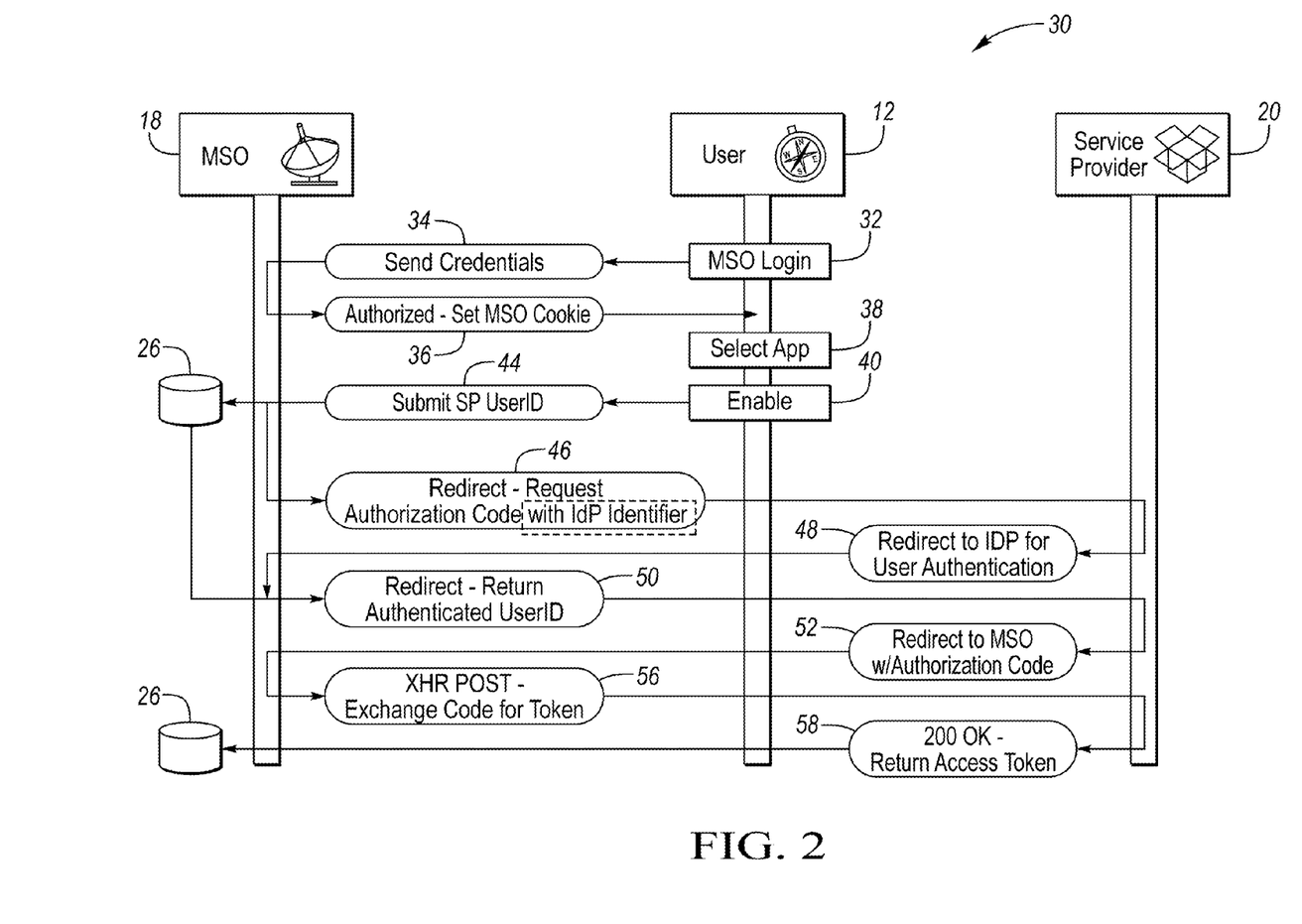
FIG. 2 illustrates a flowchart for a SAML based process for issuing access tokens in accordance with one non-limiting aspect of the present invention.

FIG. 2 illustrates a flowchart 30 for a SAML based process for issuing access tokens from the second service provider 20 to the first service provider 18. The method is described with respect to issuing access tokens from a single service provider to a single service provider for exemplary non-limiting purposes as the present invention fully contemplates facilitating similar operations for any number of service providers and/or any number of users. The flowchart generally relates to a method for authenticating a user identity for a user to the service providers 18, 20 so as to enable the user to subsequently access their user content according to permissions or other entitlement specified within a corresponding access token. The process may be executed once between the user and the first and second service providers 18, 20 such that updates or changes to the user content associated with each access token may be automatically adjusted without requiring the user to have to redo or otherwise repeatedly perform similar operations. The access tokens may be issued from the second service 20 provider and kept at the first service provider 18 in accordance with a maintenance policy and without tying the access tokens to a device used by the user at the time of undertaking the noted operations.

Figure 3:
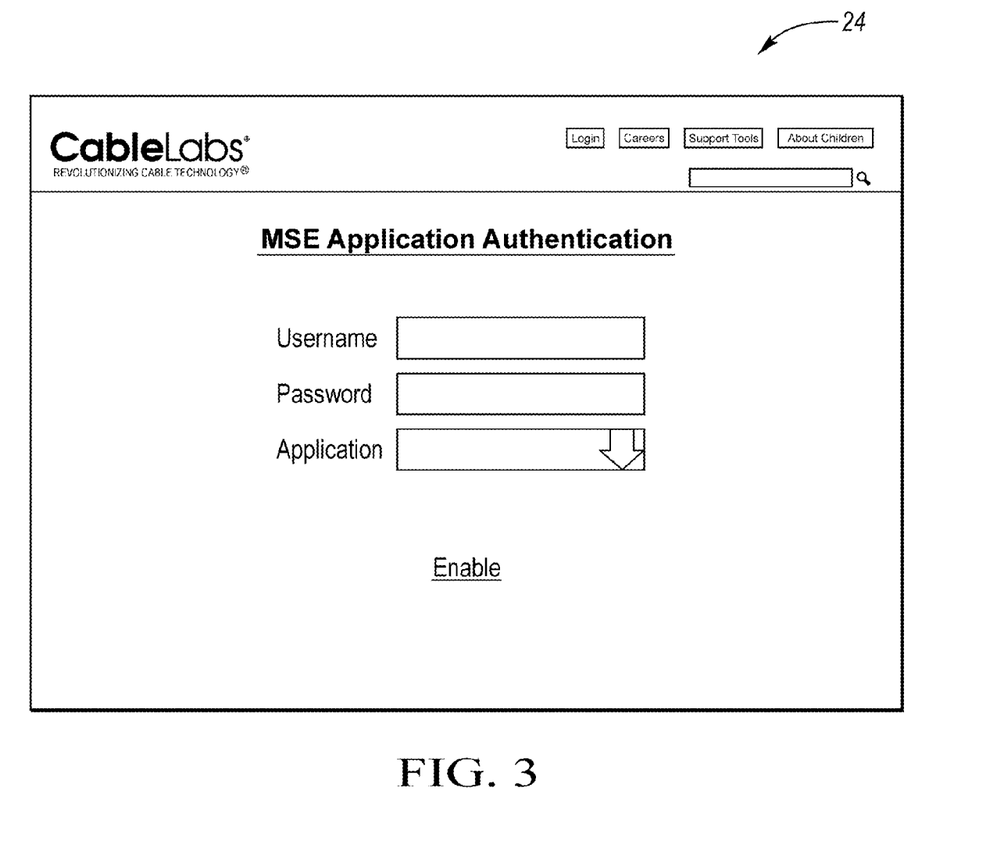
FIG. 3 illustrates a configuration portal in accordance with one non-limiting aspect of the present invention.

Block 32 relates to the user performing a login operation to the configuration portal 24. FIG. 3 illustrates the configuration portal 24 associated with the login operation in accordance with one non-limiting aspect of the present invention. The portal 24 may be displayed as a webpage downloaded to the user's device at the time of registration. The portal is shown in include a username field, a password field, an application field and an enable button. The username and password fields may be utilized to enter a user name and password combination unique to the user. The application field may provide a drop-down list or other mechanism to facilitate identifying the application of the second service provider or other service provider from which delegation of the corresponding stored user content is desired. The enable button may be a hyperlink or other command button to indicate user completion of the noted fields. The portal is illustrated as one example of many different types of user interfaces operable to facilitate receiving user inputs in accordance with the present invention. Returning to FIG. 2, Block 34 relates to sending credentials to the first service provider 18. The credentials may correspond with the username and password or other authenticating user identification.

Block 36 relates to the first service provider issuing a cookie to the user. The cookie may identify applications available for delegation and/or confer a temporary authentication to the user to facilitate selecting the applications, such as using the drop-downfield shown in FIG. 3. Following selection of the desired application in Block 38 and selection of the enable button in Block 40, Block 44 relates to submitting a service provider (SP) userID of the service provider associated with the selected application, i.e., the second service provider 20, to the first service provider 18. Block 46 relates to the first service provider performing a redirect to request an authorization code from the second service provider. Block 48 relates to the second service 20 provider obtaining a user authentication using a redirect to the specified identity provider (IdP), in accordance with SAML operations. Block 50 relates to the first service provider 18, also acting as the IdP, returning an authenticated user ID using a redirect to the second service provider 20. Block 52 relates to the second service provider 20 responsively generating an authorization code for the first service provider 18 using a redirect. Block 56 relates to the first service provider 18 issuing an XHR post with an exchange code to request an access token from the second service provider for the identified user. Block 58 relates to the second service provider generating corresponding access token and providing it to the first service provider for maintenance.

Figure 4:
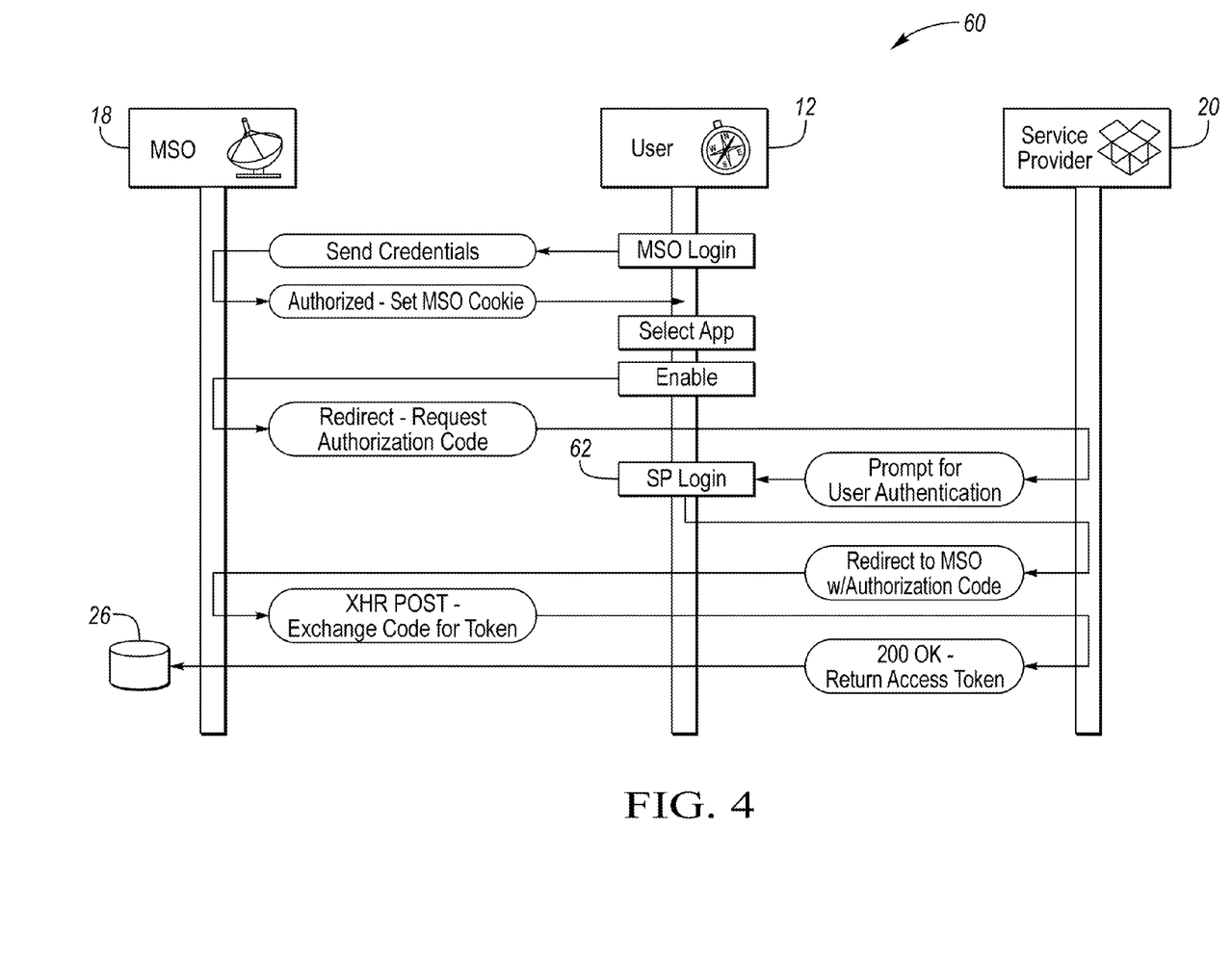
FIG. 4 illustrates a flowchart for an OAUTH based process for issuing access tokens in accordance with one non-limiting aspect of the present invention.

FIG. 4 illustrates a flowchart 60 for an OAUTH based process for issuing access tokens from the second service provider to the first service provider in accordance with one non-limiting aspect of the present invention. The OAUTH based process may be similar to the above-described SAML process where various redirects and other HTML commands are utilized to facilitate authenticating the user identity with the second service provider 20 via messaging exchanged through the first service provider 18 for the purposes of generating an access token at the second service provider 20 for storage at the first service provider 18. The OAUTH based processes may include an additional process 62 where the user may login or otherwise identify themselves to the second service provider in order to facilitate generation and issuance of the access token. The OAUTH and SAML based processes are shown for exemplary non-limiting purposes to demonstrate the use of the present invention with protocols operable over the Internet to facilitate issuing access tokens and other credentials using established messaging constructs. One non-limiting aspect of the present invention contemplates enabling the user to facilitate delivery of the access tokens from the second service provider 20 to the first service provider 18 using the configuration portal 24 or other webpage or interface maintained by the first service provider so as to facilitate maintenance of multiple access tokens at the first service provider 18, e.g., the process can be repeated for multiple users and multiple service providers so as to enable the first service provider to generate a repository of access tokens for its subscribers.

Figure 5:
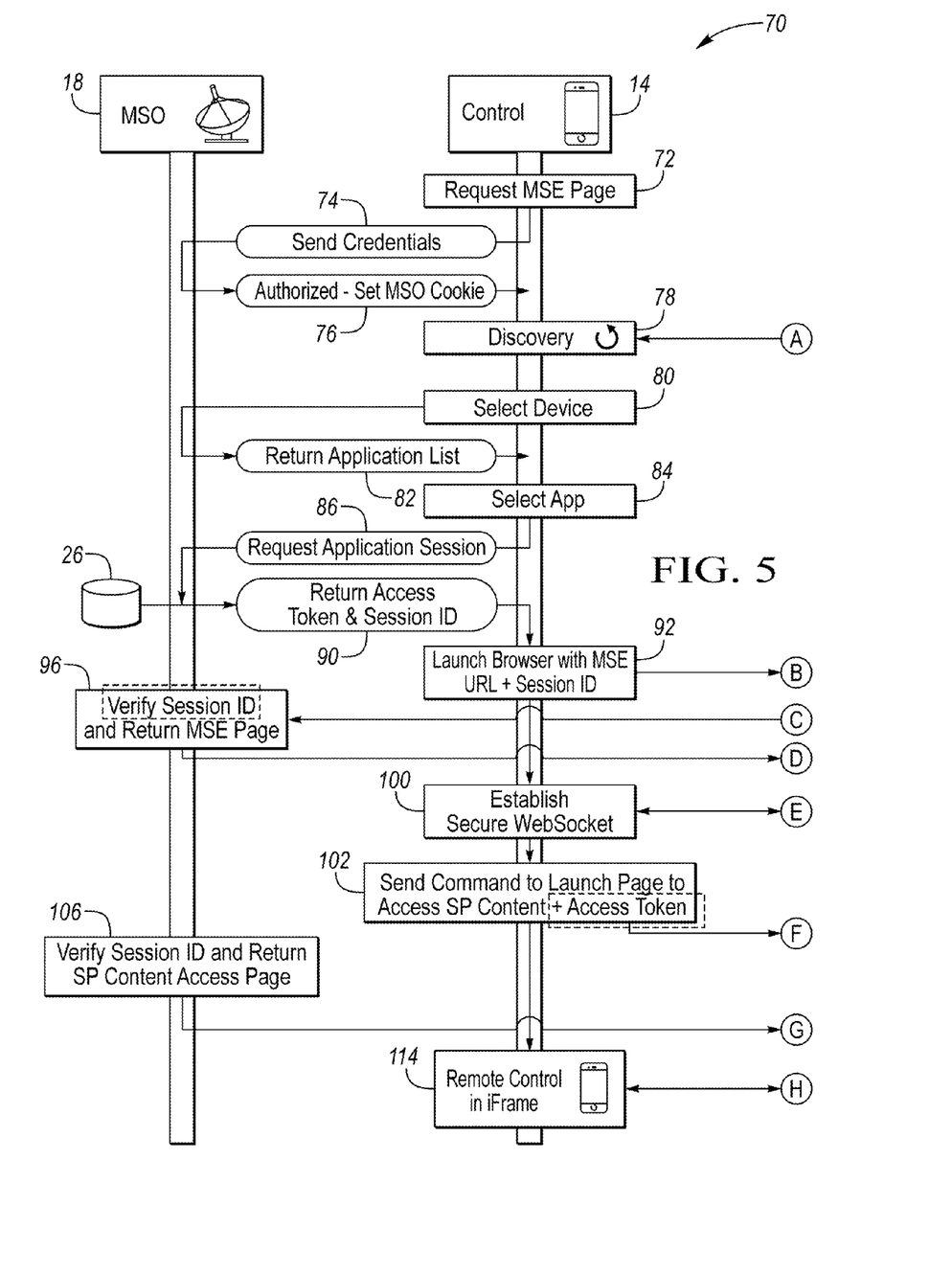
FIG. 5 illustrates a flowchart for delegating authorizations in accordance with one non-limiting aspect of the present invention.

FIG. 5 illustrates a flowchart 70 for delegating authorizations in accordance with one non-limiting aspect of the present invention. The flowchart 70 is described with respect to delegating authorizations for a single user and a single service provider to demonstrate the operations and processes of the present invention as the same or similar processes may be repeated or simultaneously performed to facilitate delegations for multiple users and/or multiple service providers. The method is described with respect to delegating authorizations to enable the user to enable the sink device 16 to access user content kept at the second service provider 20, such as to enable the sink device 16 to access movies (user content) kept by the second service provider 20 without authenticating the sink device 16 to the first service provider 18. The method contemplates beginning the delegation of authorizations from a trusted device or a device authenticated with the first service provider 18 (control device 14) or other entity tasked with maintaining multiple access tokens. Once the control device 14 is authenticated, the delegation of authorizations may be performed in a zero sign-on manner (ZSO) so that the user need not input credentials or other user identity information for the purposes of accessing the user content via the sink device 16.

Figure 6:
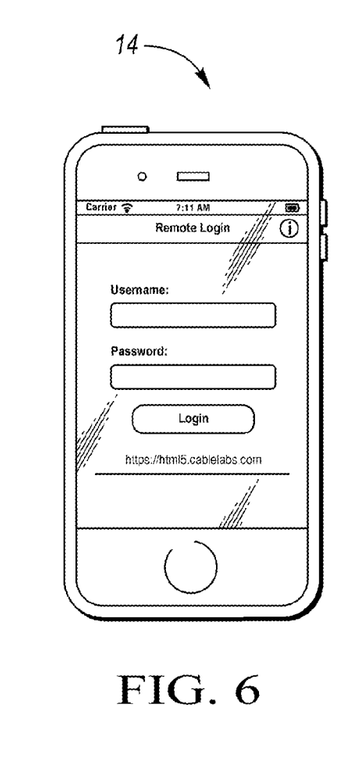
FIGS. 6-8 illustrate a MSE webpage on a control device in accordance with one non-limiting aspect of the present invention.

Block 72 relates to the control device 14 requesting access to a MSE webpage. The MSE webpage may be displayed on the control device 14 and act as an initiation point through which the authorization delegation process may begin, which for exemplary purposes is described as being hosted by the first service provider 18. FIG. 6 illustrates a login screen of the MSE webpage displayed on the control device 14 to receive a username and password combination. Block 74 relates to the control device 14 transmitting the username and password combination or other user identifying credential to the first service provider 18 (ZSO may be utilized instead of a username and password combination). Block 76 relates to the first service provider 18 responding with a cookie indicating authorization of the control device 14. The cookie may be issued from the first service provider 18 after verifying the credentials are from a user and/or a control device 14 within the domain or control of the first service provider 18. The domain of the first service provider 18 may be based on media access control (MAC) addresses or other information previously associated with the control device, such as in the manner described in patent applications incorporated by reference herein. Block 78 relates to the control device 14 performing a discovery operation to detect nearby devices that may be suitable to operate as the sink device 16 or other device to be delegated an authorization.

The discovery process is shown for exemplary non-limiting purposes to be performed according to the Simple Service Discovery Protocol (SSDP), the disclosure of which is hereby incorporated by reference in its entirety. The discovery process may determine when more devices in proximity of the control device 14 having capabilities sufficient to facilitate operations contemplated herein. The proximity assessment may be based on a wireless signaling range to the control device 14 or other characteristics sufficient to establish a proximity relationship of the sink device 16 to the control device 14. The proximity between the sink device 16 and the control device 14 may be beneficial in order to establish at least some level of trust that the device 16 being delegated authorizations is within the control or range of control of the user associated with the control device 14. Of course, if the proximity relationship is undesirable, such as if the user desires to delegate authorizations to subscribers within their home while at another location, the discovery process may rely upon other proximity related parameters to identify available sink devices 16, e.g., sink devices connected to a trusted access point of the first service provider may be similarly discovered.

The discovery of the sink device 16 may be particularly relevant to non-authenticated devices or devices that have not otherwise establish a trusting relationship with the first service provider 18 or a second service provider 20. As users may store or generate content across multiple service providers, the users may similarly desire access to that content on devices that have not been recognized or otherwise approved for operations associated with the first service provider 18 or the non-authenticated sink device 16. The ability to confer delegations to such non-authenticated devices may be beneficial in enabling users to not only access user content on authenticated devices like to the control device 14 but also to essentially access their content everywhere, i.e., non-authenticated devices. The capability to enable non-authenticated devices 16 to access user content may be beneficial when the first service provider 18 lacks the ability to authenticate the non-authenticated devices 16 on behalf of a second service provider 20 or to otherwise communicate therewith, e.g., first service provider 18 may not have developed code or protocol sufficient to enable it to communicate the user's credentials for a second service provider 20 with the non-authenticated devices 16.

Figure 7:
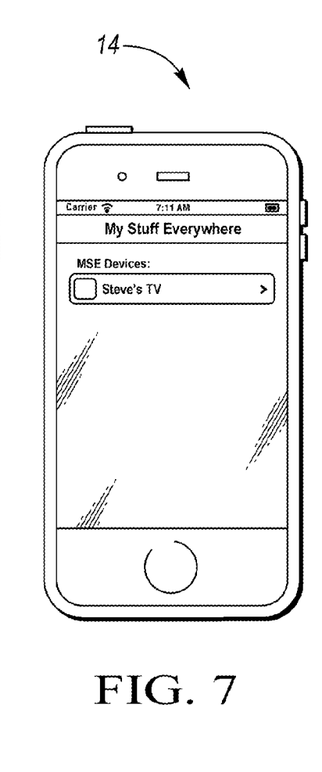

The discovery process may be performed in the background of the MSE webpage such that the MSE webpage may be automatically updated or re-loaded once one or more devices are discovered. FIG. 7 illustrates a corresponding update of the MSE webpage on the control device 14 to indicate a nearby sink device 16, which is labeled as "Steve's TV". In the event additional sink devices 16 are detected, those sink devices 16 may be similarly indicated with icons or other alphanumeric representations sufficient to distinguish them from one another. Block 80 relates to the control device detecting user selection of one of the sink devices 16 displayed as being available and communication of a corresponding message to the first service provider 18. Block 82 relates to the first service provider 18 identifying the sink device 16 and transmitting a corresponding application list to the control device 14. The application list may identify a plurality of service providers having applications operable with the identified sink device 16 and/or the applications for which the user has previously requested access tokens, i.e., the applications having access token stored at the first service provider 18. The first service provider 18 may utilize the user identity established with the credentials to determine the applications included in the application list (some service providers may support multiple applications).

Figure 8:
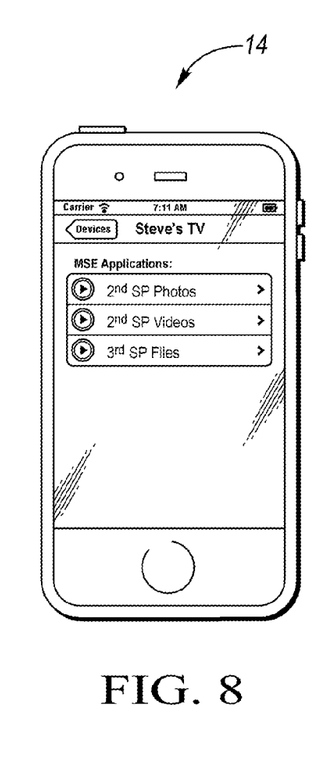

FIG. 8 illustrates the MSE webpage being updated to indicate the applications available for delegating authorizations. The updated MSE webpage indicates a first, second and third application being available for delegation of access tokens previously provided to the first service provider 18. Additional applications may be displayed through selection of an addition button (not shown) if the user fails to identify an application of interest. The addition button may be used to call up or otherwise access the configuration portal described above to facilitate enabling the first service provider to obtain access tokens for desired applications, i.e., the above processes can be repeated in order to obtain an access token for a non-listed application. The first and second applications are respectively associated with photos and videos kept at the second service provider ($2^{nd}$ SP) and the third application is associated with electronic files kept at a third service provider (3rd SP). Block 84 relates to the user selecting one of the applications shown within that MSE webpage, which is assumed for exemplary purposes to correspond with one of the applications associated with the second service provider 20. Similar processes may be performed in the event an application (e.g., third application) from a service provider other than the second service provider 20 was determined.

Block 86 relates to the control device 14 issuing a request application session message to the first service provider 18 indicating the application selected for delegation. Block 90 relates to the first service provider 18 identifying the access token associated with the application and the user identified to be making the request. The access token may be selected from a plurality of access tokens kept at the first service provider 18 for its various users and their associated applications, e.g., a single user may have multiple user access tokens for different applications, different service providers or different portions of the user content kept at the service providers. Block 90 may also include the first service provider 18 generating a session ID cookie. The session ID cookie may be a dynamically generated set of data determine proximate in time to receipt of each request for an application session. The session ID cookie may provide a set of information proximate in time to identifying a need to perform a delegation, such as to provide a relationship between the identified user (credentials), the identified sink device 16 and the identified application determined in the preceding Blocks. The session ID cookie may include timestamps, addressing information and other types of data that may be useful to tracking activities occurring as a result of the delegation, including facilitating advertisement and billing customers for usage.

Figure 9:
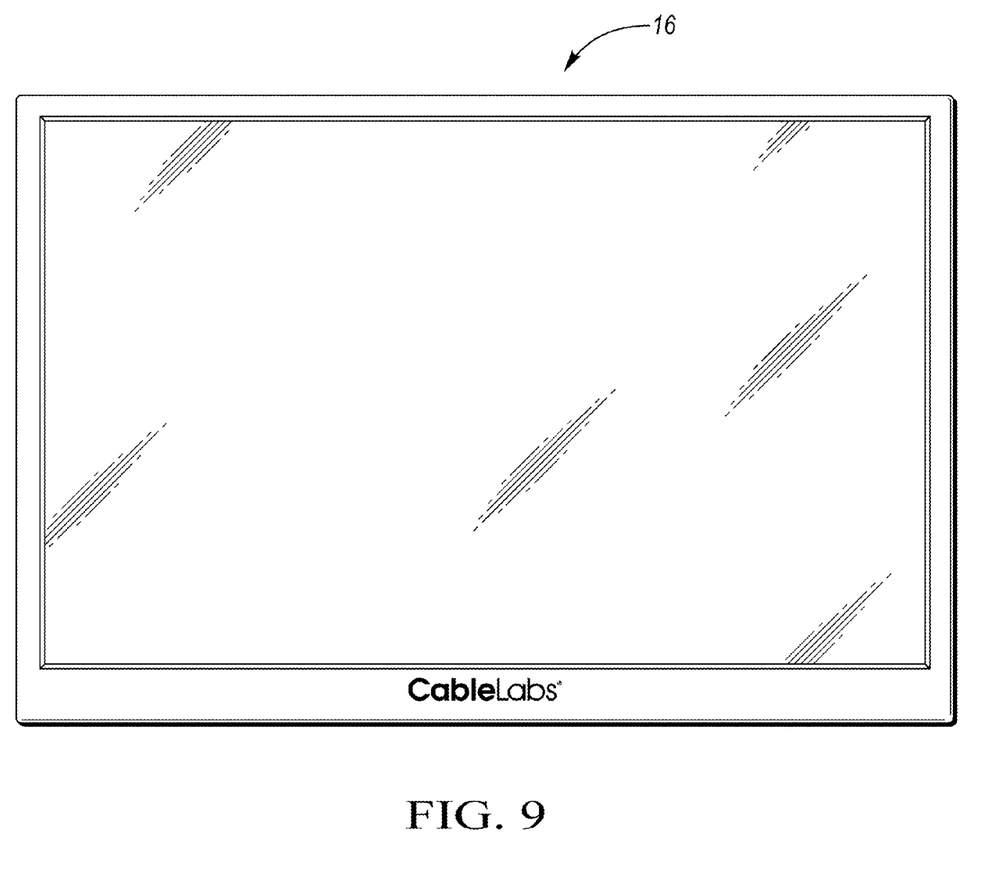
FIG. 9 illustrates a sink device in accordance with one non-limiting aspect of the present invention.
Figure 10:
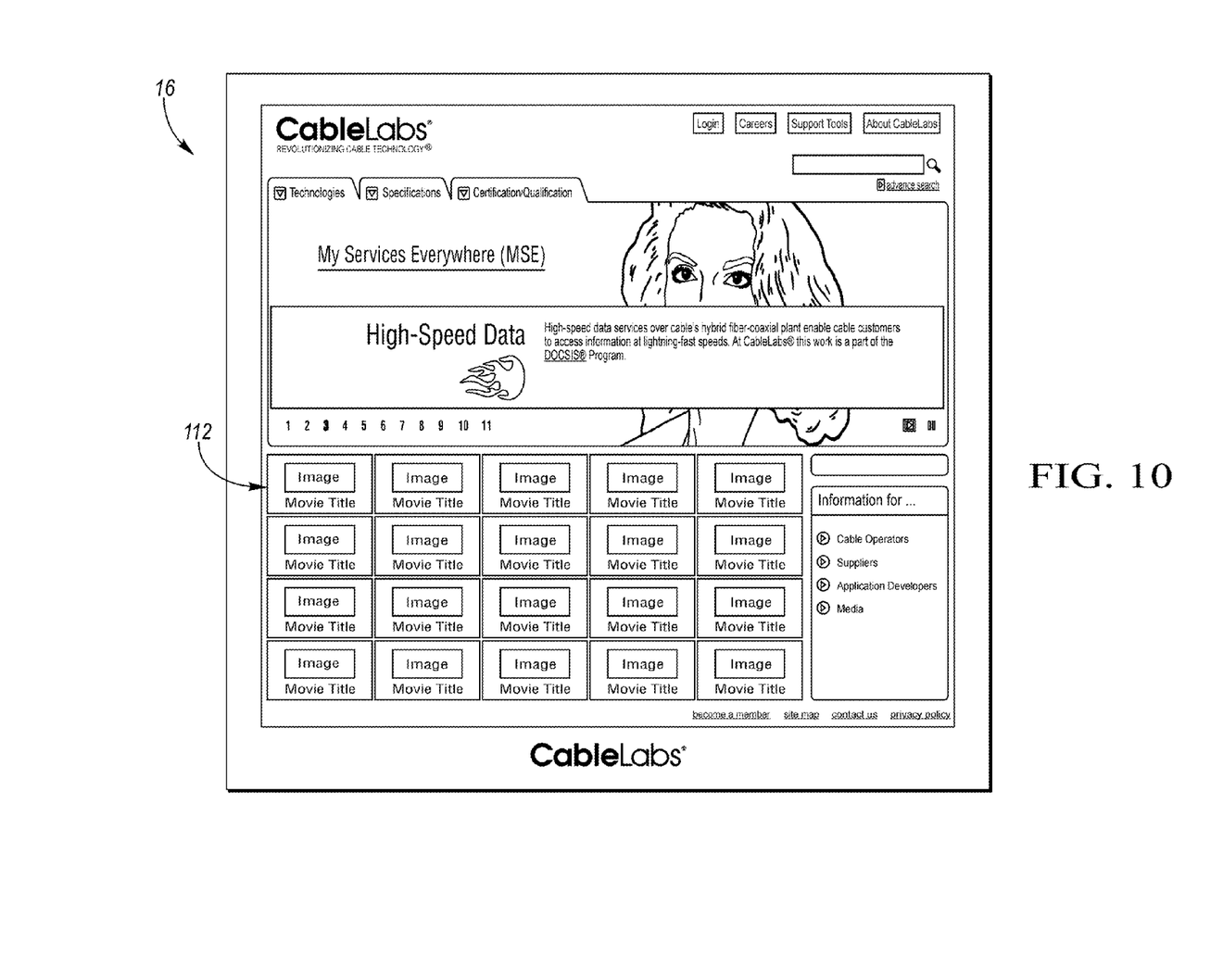
FIG. 10 illustrates a MSE webpage on a sink device in accordance with one non-limiting aspect of the present invention.

Block 92 relates to the control device 14 transmitting a launch browser command to the sink device 16 along with a MSE URL and the session ID cookie, such as through an unsecured connection establish as part of the previous discovery process. The launch browser command may prompt the sink device 16 in Block 94 to engage in a web browser to access the MSE URL for the purposes of transmitting the session ID cookie to the first service provider 18. FIG. 9 illustrates the sink device 16 being a television and launching the web browser as a function of receiving the launch browser command in accordance with one non-limiting aspect of the present invention. The television may display a blank screen as shown or additional information related to the first service provider 18 or other entity designed to provide advertisements or other information upon launching of the web browser. Optionally, the launching of the web browser may occur in the background without a user watching the television identifying the browser launch, such as to enable the delegation of authorizations prior to interrupting viewing on the television. Block 96 relates to the first service provider 18 verifying the session ID received from the sink device 16 and returning a MSE webpage. FIG. 10 illustrates the MSE webpage shown on the sink device 16 in accordance with one non-limiting aspect of the present invention.

The first service provider 18 may verify the session ID prior to returning the MSE webpage in order to assure that it was properly issued. The first service provider 18 may keep a record of session IDs and/or additional information, such as MAC or IP addresses, to determine whether the session ID is still valid, e.g., that it has not expired, and/or whether it was received from a valid sink device. One non-limiting aspect of the present invention contemplates delegating authorizations to non-authenticated devices or unsecured devices, optionally characterized by the devices lacking a relationship or prior trusting relationship with the first service provider 18. In the event the delegation is intended for such devices, the session ID verification may simply correspond with assessing whether the session ID is still valid so that it can be performed without assessing a character or nature of the sink device 16 associated therewith. Instructions may be included within the MSE webpage to prompt the sink device 16 to establish a secure connection with the control device 14 in Block 98. The secure connection may be established using a secure WebSocket, a Transport Layer Security (TLS) tunnel or other secured connection having security enhanced over that in place when exchanging the session ID with the sink device 16. Blocks 100, 102 relate to the control device establishing the secure connection and sending the sink device a command to launch a content access page and the access token.

Block 104 relates to the sink device 16 issuing a request for the content access page according to a URL included within the command of Block 102 as well as re-transmitting the session ID to the first service provider 18. The re-transmission of the session ID may be used to check for continued validity of the corresponding session, such as to confirm validity by any policies that the first service provider 18 or to enforce that the session is initiated within a certain amount of time. Block 106 may relate to the session ID being verified and the first service provider 18 returning the corresponding content access page to the sink device 16. The content access page may include instructions or the instructions may be associated therewith, such as in the form of a redirect, to prompt the sink device 16 to issue a content request in Block 108 to the second service provider 20 or other service provider associated with the application requiring delegation of authorizations. The content request may include the access token provided from the first service provider, and optionally additional information necessary to verify access to the corresponding portion of the user content. Block 110 relates to the second service provider 18 verifying the received access token, and if verified, return a corresponding portion of the user content. The received user content may be displayed within an iFrame 112 of the content access page. FIG. 10 illustrates the iFrame 112 corresponding with a portion of the MSE page.

The iFrame 112 may be essentially a page within the MSE page used to display identifying information sufficient for the user to retrieve or otherwise access their user content. The exemplary illustration assumes the user content to correspond with a plurality of movies such that the available movies may be listed in a grid with an image and movie title to facilitate selection. The user may interact with the MSE webpage to facilitate downloading or otherwise accessing the user content, such as by streaming or downloading the corresponding movie to the sink device for playback. The playback may begin in a different web browser or with full-screen viewing on the sink device 16, thereby enabling access to user content using authorizations delegated from the user identified with the control device 14. Instead of requiring the user to log the sink device 16 into the second service provider, the present invention enabled a user experience to be performed without requiring such a login while maintaining a user interface associated with the first service provider, i.e., the MSE webpage may provide branding other information associated with the first service provider while enabling user access to content kept at other service providers. Of course, the present invention is not necessary limited to providing access to the user content via an iFrame and may utilize any number of other user interfaces support playback mechanisms to facilitate access.

Figure 11:
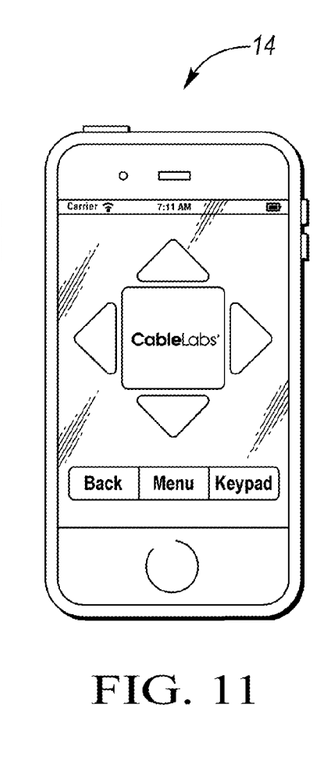
FIG. 11 illustrates a remote control webpage in accordance with one non-limiting aspect of the present invention.

Blocks 112, 114 relate to the control device 14 operating as a remote control for the user content and/or the iFrame. The remote control may be achieved by providing a shared Document Object Model (DOM) between the control device in the sink device, such as in the manner described in U.S. patent application Ser. No. 13/922,386, entitled Administration of Web Page, the disclosure of which is hereby Incorporated by reference in its entirety. FIG. 11 illustrates a remote control webpage being displayed on the control device 14 in accordance with one non-limiting aspect of the present invention. The remote control webpage may display various navigational features or other user selectable options associated with remotely controlling a pointer other feature within the MSE webpage on the sink device 16. The capability to utilize the control device 14 to remotely control the sink device 16 using shared DOM and the associated HTML messaging and other operations described in the above-Incorporated an application may be beneficial in facilitating access to user content essentially everywhere while also providing a means for remotely controlling playback and other related operations essentially through any device having HTML support.

As supported above, one non-limiting aspect of the present invention relates to a method for delegating authorizations from one device to another, such as to facilitate access to user content with a non-authorized device. The method may be embodied in a computer-readable medium, included one or more of the devices described above, having a plurality of computer-readable instructions operable with a processor and sufficient to facilitate the operations contemplated herein. The present invention may be utilized to enable an authenticated user on a personal device to confer their identity to a second, non-authenticated device, so that non-authenticated device can participate in an authorization protocol, such as SAML or OAUTH, using the authenticated user's identity and a specified identity provider. The capability to confer authorizations may be beneficial in order to enable, among other things, a means for a user to access their MSO, 3rd party and personal content via unsecured devices without having to perform any authentication steps on that unsecured device. This capability may be beneficial in ameliorating the need for the user to remember user name and password combinations overlong. Time for certain service providers as well as to limit others from detecting their username and password combination, e.g., the control device may optionally be authenticated using ZSO so that the stored access tokens can be conferred to the sink device without the user ever having to enter in username and password.

The present invention may facilitate a broad set of MSO services whereby an MSO customer can access any of their MSO, personal or 3rd party content, through the MSO customer's personal device on any nearby audio/video display device without any explicit login or authentication on that nearby device. This provides customers a seamless way to access any of their content wherever they are. It may be particularly help in leveraging capabilities for current video and broadband subscriber bases as well as to make the related MSO service richer. One non-limiting aspect of the present invention contemplates discriminating services on a per customer or individual customer basis, including using such individuality to enable users to access their MSO content on 3rd party browsers without having to specify their identity provider, without having to authenticate that the user is an MSO customer and/or without out requiring user input on the unsecured device.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method for delegating authorization to access user content kept at a plurality of service providers, the plurality of service providers associating the user content for a plurality of users with one or more of a plurality of access tokens such that each access token confers access to the user content of the associated user, the method comprising:
   receiving the plurality of access tokens from the plurality of service providers after the plurality of service providers associates each of the plurality of access tokens with at least one of the plurality of users;
   receiving credentials from a control device, the credentials identifying a first user of the plurality of the users and being received as a function of the first user interacting with a first webpage displayed on the control device;
   selecting a first access token associated with the first user identified with the credentials from the plurality of access tokens received from the plurality of service providers;
   transmitting the first access token to the control device for subsequent transmission to a sink device; and
   transmitting a content request redirect to the sink device to prompt the sink device to transmit the first access token to a first service provider of the plurality of service providers, the first service provider verifying the first access token prior to responsively transmitting a first user content associated with the first access token to the sink device.

2. The method of claim 1 further comprising identifying the sink device as a function of the first user interacting with the first webpage displayed on the control device.

3. The method of claim 2 further comprising identifying the first service provider as a function of the first user interacting with the first webpage displayed on the control device.

4. The method of claim 3 further comprising:
   determining the first user to be associated with multiple access tokens associated with different service providers; and
   selecting the first access token from the multiple access tokens as a function of the first service provider identified from the first user interacting with the first webpage.

5. The method of claim 3 further comprising transmitting a session ID cookie with the first access token to the control device, the session ID cookie representing a relationship of the first user to the control device, the sink device and the first service provider proximate in time to receipt of the credentials.

6. The method of claim 5 further comprising transmitting a first universal resource locator (URL) with the session ID cookie to the control device, the control device subsequently transmitting the first URL and the session ID cookie to the sink device through an unsecure connection, the sink device transmitting the session ID cookie to a server associated with the first URL.

7. The method of claim 6 further comprising verifying the session ID cookie as received at the server and downloading a second webpage to the sink device when the session ID cookie is verified.

8. The method of claim 7 further comprising including instructions within the second webpage to prompt the sink device to establish a secure connection with the control device, the control device providing the access token and a second URL to the sink device through the secure connection, the second URL causing the sink device to create an iFrame within the second webpage and to re-transmit the session ID cookie to the server.

9. The method of claim 8 further comprising downloading a content access page to the sink device for display within the iFrame and including instructions with the content access page to prompt the sink device to transmit the first access token to the first service provider, the first user content received in response to the first access token then being displayed within the content access page of the iFrame, the first service provider being different from a second service provider associated with the sink device.

10. The method claim 9 further comprising transmitting a first authorization code to the first service provider following receipt of an enable message from the control device, the first service provider responsively transmitting the first access code to the server for the subsequent transmission to the control device, the enable message being generated at the control device as a function of user interaction with a third webpage displayed on the control device prior to determining the first service provider as a function of user interaction with the first webpage.

11. The method of claim 1 further comprising receiving the plurality of access tokens at a database associated with a multiple system operator (MSO) prior to the first access token being transmitted from the database to the control device.

12. The method of claim 1 further comprising transmitting the first access token to the control device without receiving credentials from the sink device before the first user content is transmitted thereto or without associating the sink device with the credentials of the control device.

13. A method of enabling access to user content kept at a first service provider without requiring a requesting device to provide a username and password or other user identifying credential for an associated user to the first service provider, the first service provider requiring receipt of the username and password or the other user identifying credential prior to issuing an access token required to access the user content, the method comprising:
   storing the access token at a second service provider after issuance from the first service provider;
   authenticating a conferring device to access a my services everywhere (MSE) service associated with the second service provider as a function of user identifying information received therefrom as a function of the first user interacting with a first webpage displayed on the conferring device;
   receiving a request from the conferring device to enable the requesting device to access the user content via the MSE service; and
   transmitting the access token from the second service provider to the conferring device, the conferring device then transmitting the access token to the requesting device to access the user content from the service provider, the access token thereby being provided to the requesting device without the requesting device having to provide the username and password or the other user identifying credential to either one of the first and second service providers.

14. The method of claim 13 further comprising transmitting the username and password or the other user identifying credential from the second service provider to the first service provider in order to obtain the access token from the first service provider for storage at the second service provider.

15. The method claim 13 further comprising facilitating display of the user content within a MSE webpage downloaded to the requesting device, the MSE webpage having branding for the second service provider.

16. The method claim 15 further comprising facilitating shared document object model (DOM) remote control of the MSE webpage via the conferring device.

17. A non-transitory computer-readable medium having a plurality of instructions operable with a processor to facilitate a my services everywhere (MSE) service, the MSE service enabling a control device to confer authorizations to a sink device to access user content without requiring input of personally identifying information through the sink device, the user content being kept at a plurality of service providers, the plurality of service providers associating the user content for a plurality of users with one or more of a plurality of access tokens such that each access token confers access to the user content of the associated user, the plurality of instructions being sufficient for:
  facilitating an access token issuance process whereby the plurality of access tokens are received from the plurality of service providers as a function of personally identifying information obtained from the plurality of users;
  downloading a first MSE page to the control device as a function of personally identifying credentials received therethrough, the personally identifying credentials identifying a first user of the plurality of users as a function of the first user interacting with a first webpage displayed on the control device;
  transmitting a first access token to the control device via the first MSE page subsequent transmission to the sink device, the first access token being determined based on the credentials to be associated with the first user, the first access token being selected from the plurality of access tokens received from the plurality of service providers as a function of the personally identifying information; and
  downloading a second MSE page to the sink device, the second MSE page prompting the sink device to transmit the first access token to a first service provider of the plurality of service providers, the first service provider verifying the first access token prior to responsively transmitting a first user content associated with the first access token to the sink device.

18. The non-transitory computer-readable medium of claim 17 further comprising instructions sufficient for displaying the first user content within an iFrame of the second MSE page downloaded to the sink device, thereby causing the first user content to be displayed on the sink device without requiring the user to input through the sink device the personally identifying information used to obtain the first access token from the first service provider.

19. The non-transitory computer-readable medium of claim 17 further comprising instructions sufficient for facilitating shared document object model (DOM) remote control of the second MSE webpage on the sink device via user inputs made to the first MSE webpage the of the control device.

* * * * *